(12) United States Patent
Larsson et al.

(10) Patent No.: US 9,008,483 B2
(45) Date of Patent: Apr. 14, 2015

(54) OPTICAL FIBER CABLE DROP INTERFACE BOX

(75) Inventors: Nicholas B. Larsson, Blomkest, MN (US); Andrew E. Swienton, Plymouth, MN (US); George I. Wakileh, Batavia, IL (US)

(73) Assignee: Communications Systems, Inc., Hector, MN (US)

( * ) Notice: Subject to any disclaimer, the term of this patent is extended or adjusted under 35 U.S.C. 154(b) by 0 days.

(21) Appl. No.: 14/009,955

(22) PCT Filed: Apr. 5, 2012

(86) PCT No.: PCT/US2012/032320
§ 371 (c)(1),
(2), (4) Date: Oct. 4, 2013

(87) PCT Pub. No.: WO2012/138856
PCT Pub. Date: Oct. 11, 2012

(65) Prior Publication Data
US 2014/0023334 A1      Jan. 23, 2014

Related U.S. Application Data

(60) Provisional application No. 61/472,008, filed on Apr. 5, 2011.

(51) Int. Cl.
*G02B 6/00*       (2006.01)
*G02B 6/44*       (2006.01)

(52) U.S. Cl.
CPC .............. *G02B 6/4446* (2013.01); *G02B 6/445* (2013.01); *G02B 6/4471* (2013.01); *G02B 6/4478* (2013.01)

(58) Field of Classification Search
CPC ....................................... G02B 6/4452–6/4455
USPC ......................................................... 385/135
See application file for complete search history.

(56) References Cited

U.S. PATENT DOCUMENTS

| 5,109,467 A | 4/1992 | Hogan et al. |
| 2003/0103750 A1 | 6/2003 | Laporte et al. |

(Continued)

FOREIGN PATENT DOCUMENTS

| JP | 2006195498 | 7/2006 |
| JP | 2009109729 | 5/2009 |

OTHER PUBLICATIONS

Search Report and Written Opinion dated Jul. 3, 2012 for International Application No. PCT/US2012/032320 filed Apr. 5, 2012, 13 pages.

(Continued)

*Primary Examiner* — Jerry Blevins
(74) *Attorney, Agent, or Firm* — John D. Veldhuis-Kroeze; Westman, Champlin & Koehler, P.A.

(57) ABSTRACT

Disclosed are exemplary embodiments of a drop interface box (DIB) for interfacing between an optical network service provider's heavy jacketed drop cable and optical distribution cables at a premises. The DIB provides organized drop, feed and distribution fiber cable storage and routing in a manner which does not cross different cables types when additional cables are added, and which maintains minimum bend radius of the cables and inhibits cable strain. In exemplary embodiments, a hinged fiber storage panel includes spools, cable clips and integrated cable channels that maintain cable radius during transitions of cables from a storage side or plane of the panel to a connector side or plane of the panel.

19 Claims, 17 Drawing Sheets

(56) References Cited

U.S. PATENT DOCUMENTS

| | | |
|---|---|---|
| 2004/0062508 A1 | 4/2004 | Blankenship et al. |
| 2007/0086721 A1 | 4/2007 | Dobbins et al. |
| 2009/0202214 A1 * | 8/2009 | Holmberg et al. ............ 385/135 |

OTHER PUBLICATIONS

Communication dated Sep. 19, 2014 issued in Columbian Patent Application No. 13-250.102, 14 pages.

* cited by examiner

OPTICAL FIBER CABLE DROP INTERFACE BOX

CROSS-REFERENCE TO RELATED APPLICATION

This Application is a Section 371 National Stage Application of International Application No. PCT/US2012/032320, filed Apr. 5, 2012 and published as WO 2012/138856 on Oct. 11, 2012, in English, the contents of which are hereby incorporated by reference in their entirety.

BACKGROUND

Disclosed embodiments relate to connection of an optical fiber feed or "drop" cable from an optical fiber service provider to a distribution point at a residence, dwelling or other building, such as a multi-unit dwelling. More particularly, disclosed embodiments relate to an enclosure for distribution of a passive optical fiber network. The enclosure will generally be mounted on a multi-dwelling residence, but can be mounted anywhere such distribution of a passive optical fiber network is desired to provide vertical, horizontal with one or multiple buildings in addition to providing building to building distribution using a variety of splice or termination options like ribbon splice or terminations.

Optical fiber is used in different delivery topologies to provide network access, for example internet access, to homes, businesses and other premises. Fiber to the x (FTTx) is a collective term for various optical fiber delivery topologies that are categorized according to where the fiber terminates. Optical fiber has commonly been used for long-distance parts of the network, but other communications media such as metal cabling has frequently been used in delivery to the customer premises. However, increasingly, optical fiber is being used to provide network access all of the way to the customer premises, and even within the customer premises.

Typically, a feed or drop optical fiber cable is provided to a premises, by an optical fiber service provider, from a larger distribution point or connection (e.g., a pole mounted distribution point). The feed is typically a heavy jacketed or hardened multi-fiber cable that is broken out at the premises into individual fiber connections. This is for example commonly the case at multi-dwelling residential buildings or at buildings that house multiple different businesses. Individual distribution fiber cables from inside each living or workplace unit are connected with adapters to the individual feed fiber optical cable connections from the multi-fiber drop cable.

Increasingly, optical fiber cables are pre-connectorized—that is they are shipped from a factory with terminating connectors already installed. This can lead to the need for installers to deal with excess optical fiber cable length in many instances. Other factors can also result in excess cable length. Storage of the excess cable length can be problematic, as can organization of the drop optical fiber cable, the multiple individual feed optical fiber cables, and the multiple individual distribution optical fiber cables which are connected to the individual living or workplace units. The fact that the various optical fiber cables are pre-connectorized provides other challenges when attempting to store or organize the cables. Also, there is a need to protect the optical fiber cables from excessive strain, as well as from damage due to bending the cables at too small of a bend radius.

The discussion above is merely provided for general background information and is not intended to be used as an aid in determining the scope of the claimed subject matter.

SUMMARY

Disclosed are exemplary embodiments of a drop interface box (DIB) for interfacing between an optical network service provider's heavy jacketed drop cable and optical distribution cables at a premises. The DIB provides organized drop, feed and distribution fiber cable storage and routing in a manner which does not cross different cables types when additional cables are added, and which maintains minimum bend radius of the cables and inhibits cable strain. In exemplary embodiments, a hinged fiber storage panel includes spools, cable clips and integrated cable channels that maintain cable radius during transitions of cables from a storage side or plane of the panel to a connector side or plane of the panel.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIGS. 2-1 and 2-2 are perspective views of the DIB illustrated in FIG. 1.

FIGS. 3-1 through 3-4 are illustrations of features of exemplary DIB embodiments which provide weather resistant seals, minimize strain on fiber cables, and prevent cable damage due to bending.

FIGS. 4-1 and 4-2 are views of a base, cover and hinged fiber storage panel of a DIB in accordance with exemplary embodiments.

FIGS. 5-1 through 5-3 are diagrammatic illustrations of drop, feed and distribution cable routing and storage in exemplary DIB embodiments.

FIG. 5-4 is a view of an exemplary DIB showing drop, feed and distribution cable routed and stored as shown in FIGS. 5-1 through 5-3.

FIG. 6-1 is a diagrammatic illustration of feed and distribution cable routing to a front side of the fiber storage panel in accordance with exemplary embodiments.

FIGS. 6-2 and 6-3 are diagrammatic illustrations of distribution cable entrance features which provide weather resistant sealing and prevent cable damage due to bending.

FIG. 6-4 is a view of an exemplary DIB showing feed and distribution cable routing to the front side of the fiber storage panel in accordance with exemplary embodiments as shown in FIG. 6-1.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted,"

"connected," "supported," and "coupled" and variations thereof are used broadly and encompass both direct and indirect mountings, connections, supports, and couplings. Further, "connected" and "coupled" are not restricted to physical or mechanical connections or couplings.

Disclosed embodiments include a drop interface box (DIB) which provides an easy to use and reliable solution to FTTx deployments using factory terminated optical cable assemblies. The disclosed DIB includes integrated slack storage compartments which provide ample room to store excess cable length while maintaining separation of hardened drop, feeder breakout, and distribution cables. This unique slack storage design allows for drop and distribution cables to be added quickly and easily as demand increases. Use of the disclosed DIB is not limited to use with these pre-connectorized optical cables.

Figure 1:
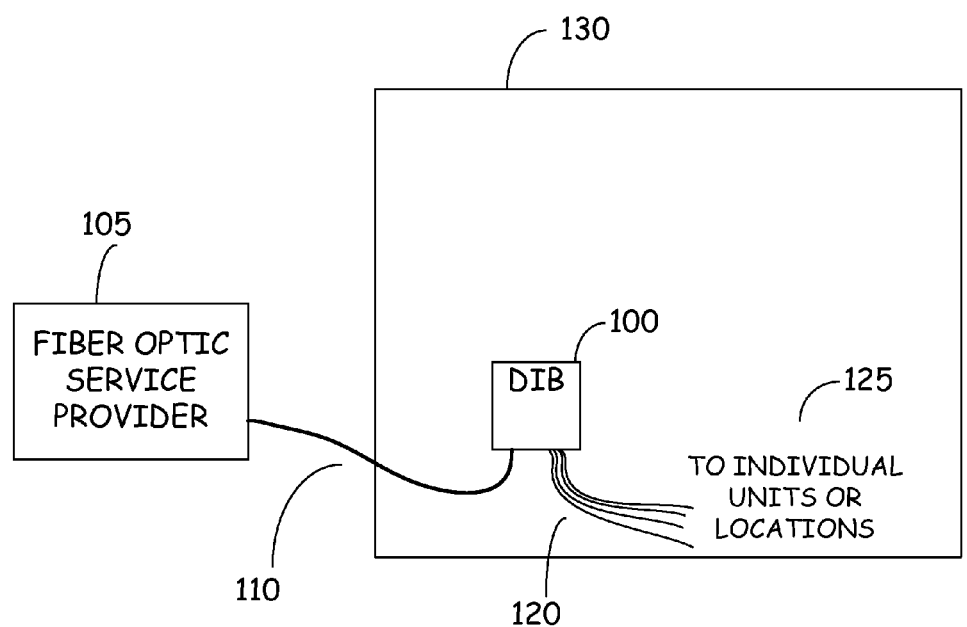
FIG. 1 is a diagrammatic illustration of the use of a drop interface box (DIB) in accordance with disclosed embodiments.

Referring now to FIG. 1, shown is a diagrammatic illustration of the use of DIB 100 in accordance with exemplary embodiments. DIB 100 mounts at a desired location of a premises 130, which will typically be a multi-dwelling or multi-business type of premises in which multiple individual living spaces or units are included in a single larger building. However, DIB 100 is not limited to use in this type of premises. DIB 100 is configured to receive and partially house a hardened "drop" cable 110 from an optical fiber service provider distribution point 105, which can be, for example, a pole mounted box connected to the provider's network. Inside of DIB 100, drop cable 110 is split into feeder breakout cables 550 (shown in FIG. 5-4) and converted into multiple distribution cables 120 which are connected in or to the individual units or locations 125 of premises 130. DIB 100 has numerous features, described below in detail, which aid in the organization and storage of the various cables, including pre-connectorized cables.

Figures 1, 2:
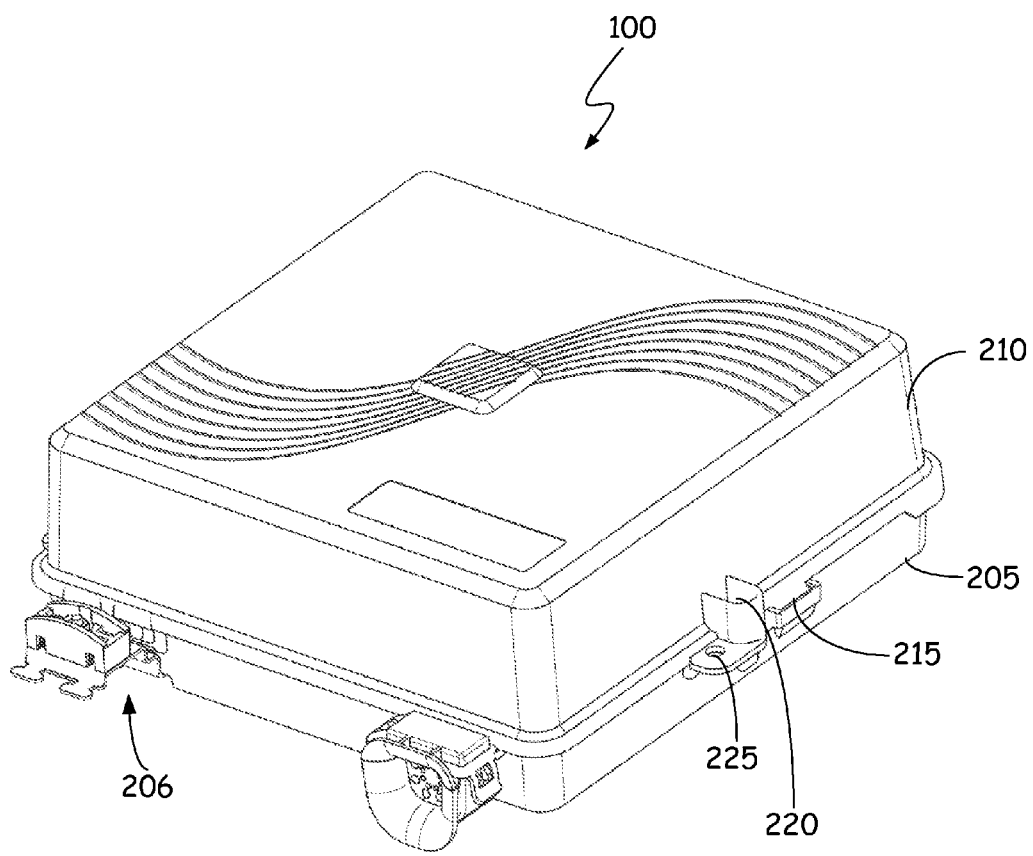
Figure 2:
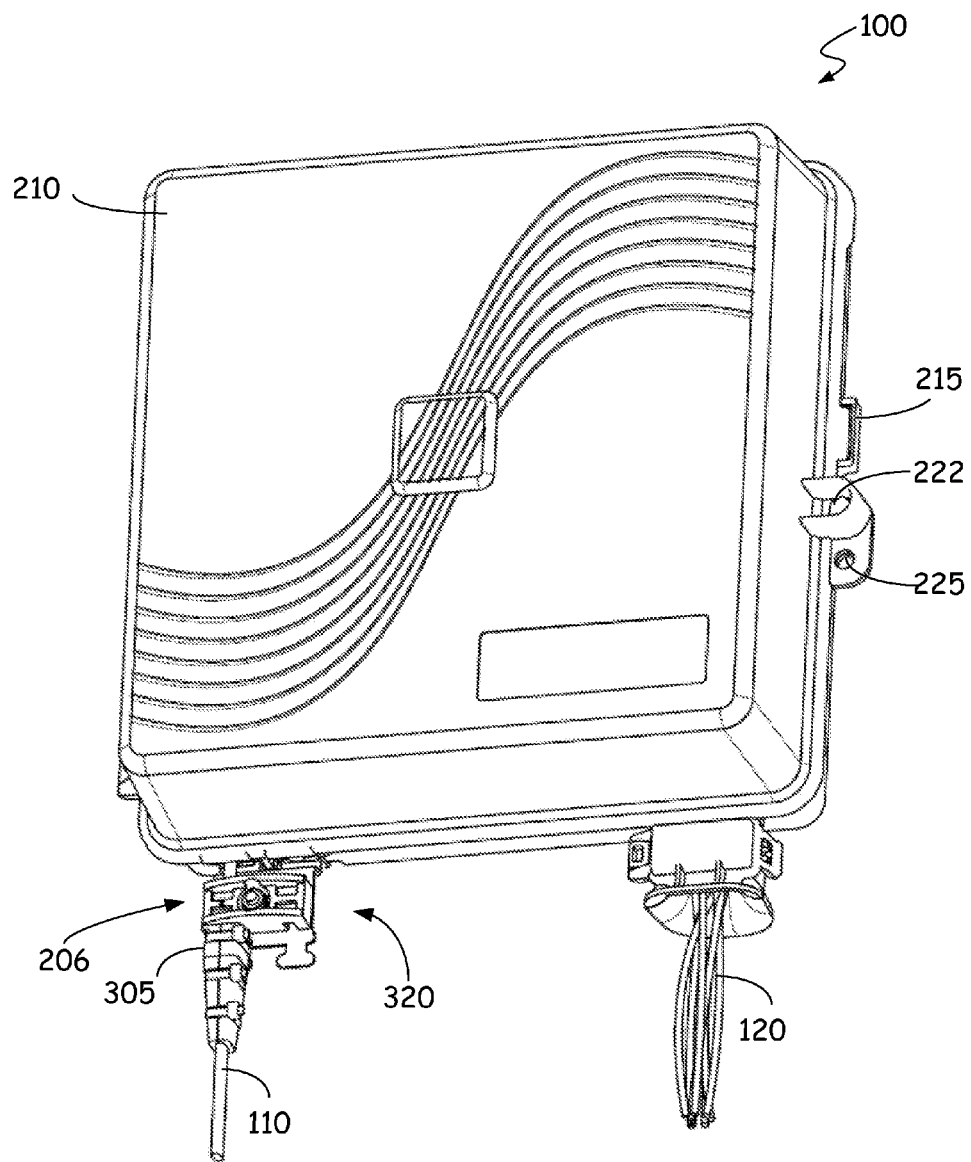

Referring now to FIGS. 2-1 and 2-2, shown are side and front perspective views of DIB 100 in accordance with an exemplary embodiment. As shown in these Figs., DIB 100 includes a base unit 205 and a door or cover 210 which has a hinged connection to the base unit. A push to close cover latch 215 secures cover 210 to base unit 205 in a closed position, and a security screw housing 220 is formed with or in cover 210 and is configured to receive a security screw 222 for denying entry into DIB 100 to persons without a proper tool. For instance, in an exemplary embodiment, security screw 222 is a ⅜ inch security screw which is configured to be used with a "216 tool" of the type which is well known in the art. For further security, a padlock hasp 225 is also included in an exemplary embodiment for receiving a padlock (not shown) to lock cover 210 to base unit 205 in a closed position. In one exemplary embodiment, padlock hasp 225 can be integrally formed with the material of cover 210 and base unit 205. For example, in an exemplary embodiment cover 210, base unit 205 and the above-described components (not including security screw 222) are formed of a plastic material. In other embodiments, hasp 225 and/or other components are formed of other materials (e.g., metals) which are attached to cover 210 and/or base unit 205.

DIB 100 includes features which enable the entry of pre-connectorized cables (e.g., cables 110 and/or 120) into the DIB by an installer. A drop cable entrance 206 is configured to receive a drop cable from an optical service provider. Many conventional enclosures require cable to be fed through slots or apertures of a size which cannot accommodate pre-connectorized cables, but DIB 100 utilizes unique features to accommodate pre-connectorized cables. Yet other features of DIB 100 help to prevent damage to cables due to strain or bending. Both features that facilitate the use of pre-connectorized cables, and features that prevent strain or bending damage to the cables, are illustrated in detail in FIGS. 3-1 through 3-4.

Figure 3:
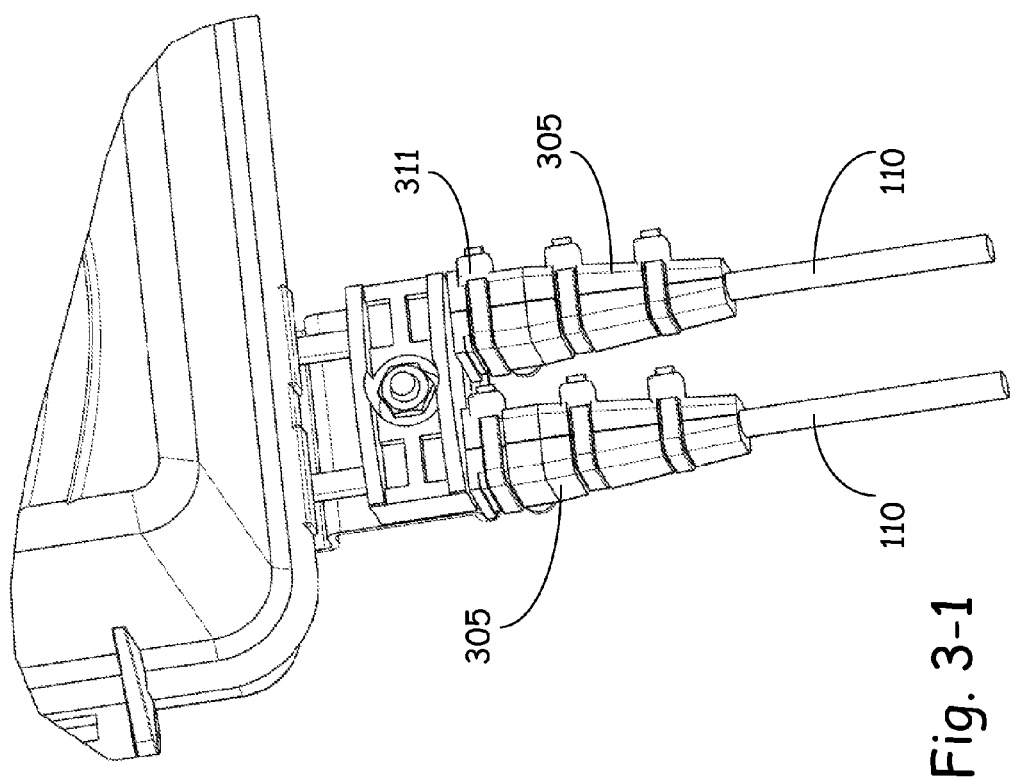
Figure 1:
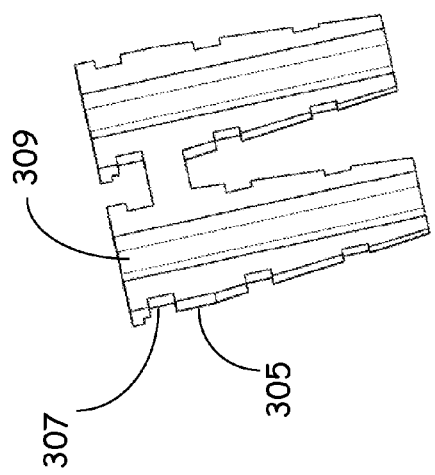
Figure 3:
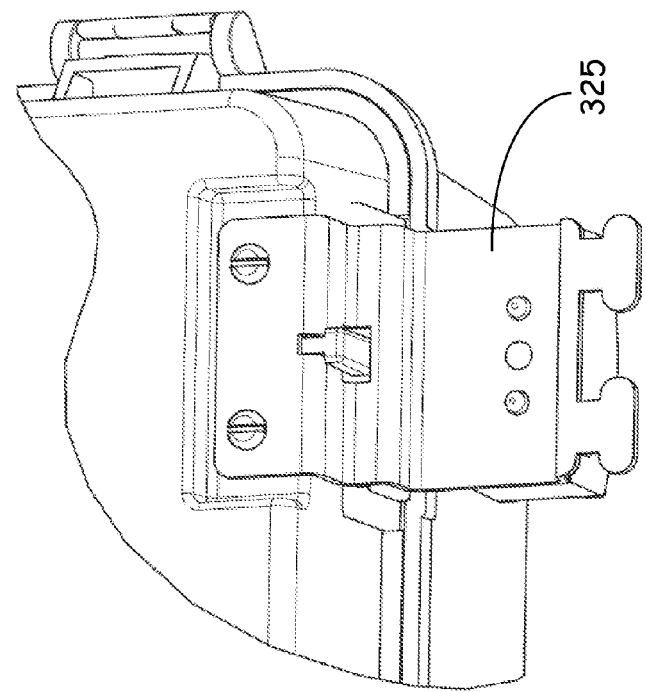
Figure 2:
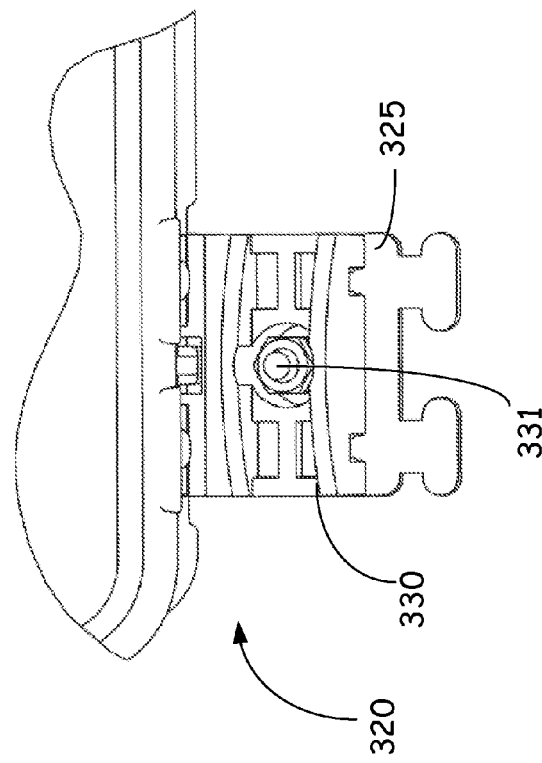
Figure 3:
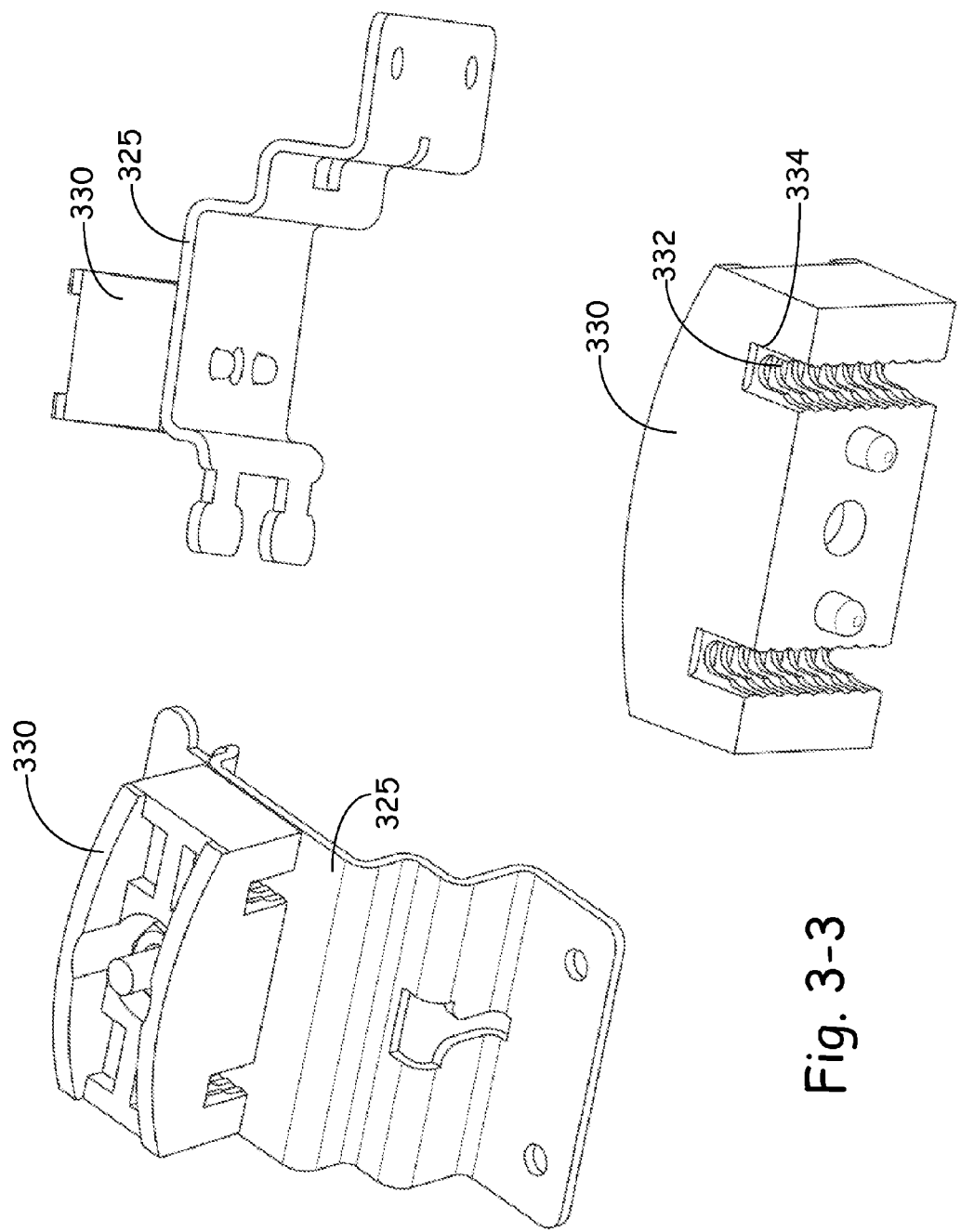

Shown in FIG. 3-1 is a bend limiting cable boot 305 which is formed in a flexible molded clam-shell design to allow the boot to be installed over the pre-connectorized drop cable 110 without having to feed the cable through the boot. The boot 305 has a central channel 309 in which cable 110 is positioned when the two portions of the boot are closed together. Slots 307 are formed in the boot 305 so that the boot is secured to the cable 110 and to a cable clamp bracket (shown in FIG. 3-2) using standard cable ties 311, commonly available to installers. The flexible material, for example rubber, and tapered shape of boot 305 supports the cable 110, preventing a sharp bend in the cable at the edge of the strain-relief clamp 320 (shown in FIG. 3-2) when the cable 110 is pulled in any direction.

Referring now more particularly to FIGS. 3-2 and 3-3, shown are components of a strain-relief cable clamp 320 which comprises a mounting bracket 325 and rigid clamp block 330 that engages the cable jacket of cable 110 in order to retain the cable position when axial force is applied to the cable. One or more threaded fasteners 331 provide a mechanical advantage while engaging the clamp block 330 and cable jacket. The position of the threaded fastener 331 and the shape of the clamp block 330 provide limited access to the general public while allowing the installer to use a "216 wrench", commonly available to telcom installers. In exemplary embodiments, during factory assembly of the clamp components, the treaded fastener 331 is deformed to prevent clamp components from being separated during field operation. This prevents dropping or losing the components during operation. As is seen in the illustration of FIG. 3-3 which shows clamp block 330 isolated and from a bottom perspective view, the rigid clamp block has ribs/ridges 332 in the cable channels 334 to help keep the cable from slipping when clamped onto the drop cable 110.

Figures 3, 4:
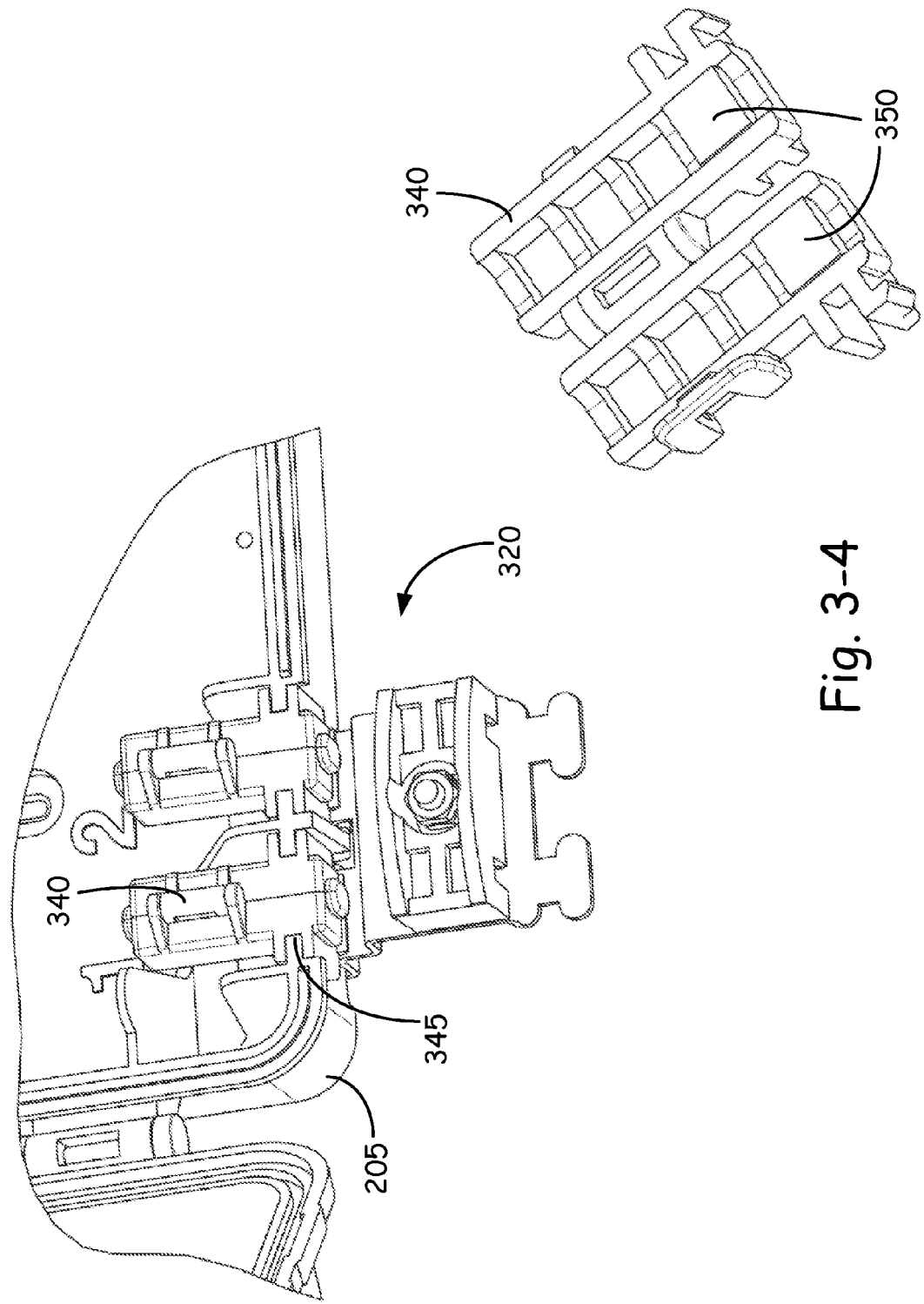
Figures 1, 4:
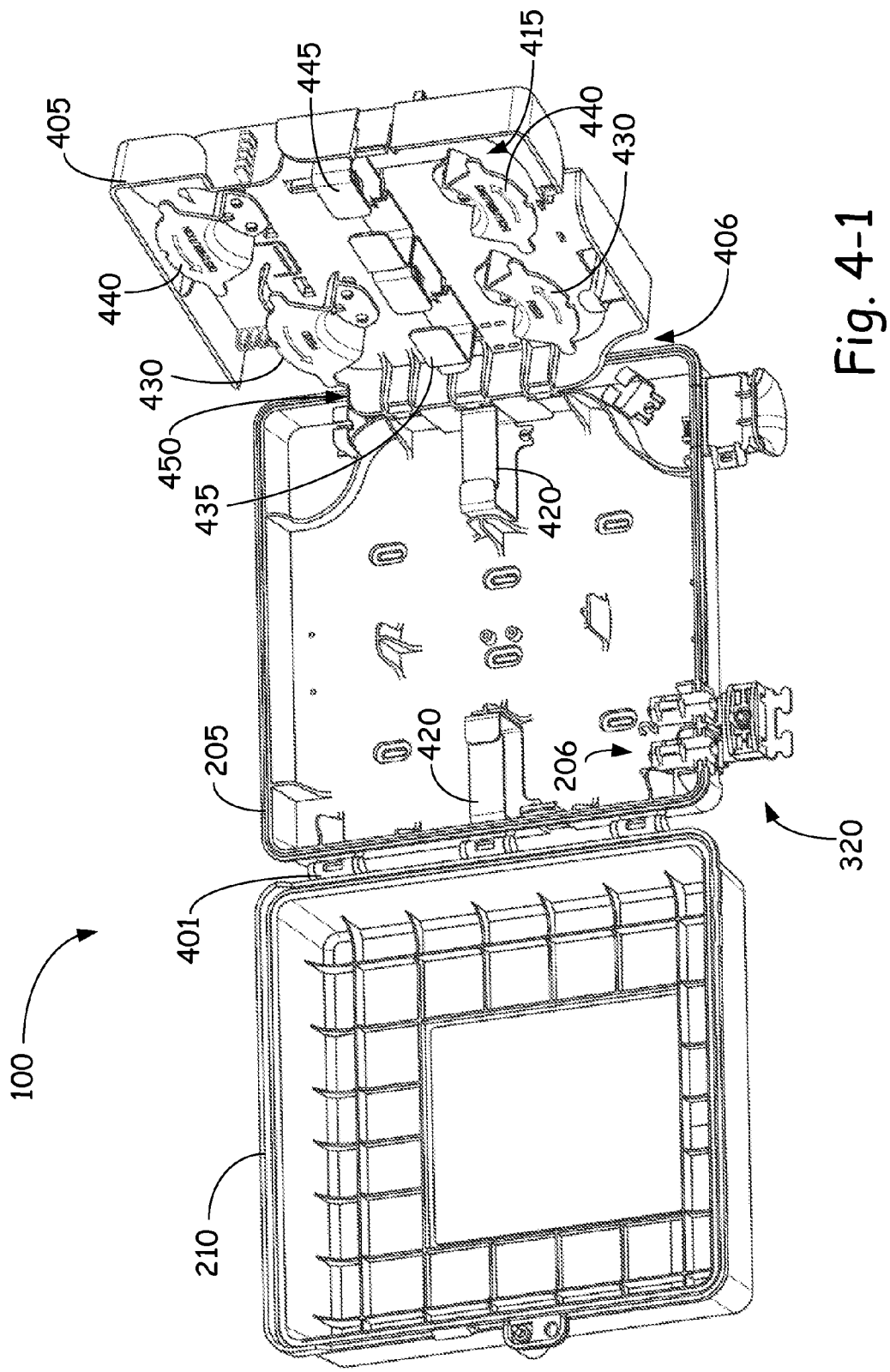
Figures 2, 4:
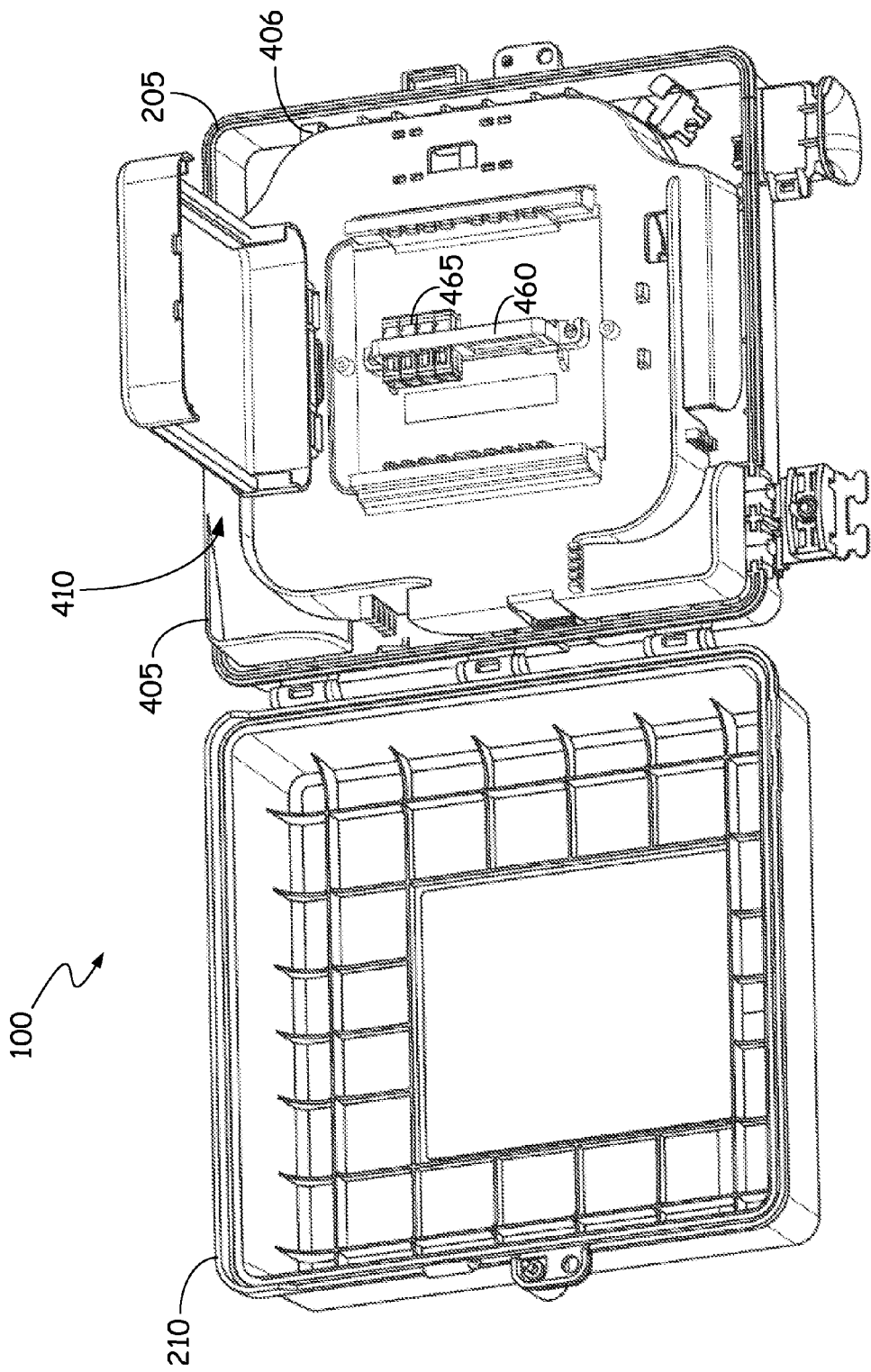

Referring now to FIG. 3-4, shown is a weather proof or weather resistant cable entrance clip feature of DIB 100 in accordance with an exemplary embodiment. In the illustrated exemplary embodiment, cable clips 340 are of a rigid clam shell design to clip over the cable 110 without feeding the cable though. The clips 340 slide into flanges or slots 345 inside of the base 205 in an area adjacent to relief cable clamp, which is outside of base 205, to create a substantially weather tight seal between the clips 340 and base 205 of DIB 100. Closed cell foam gaskets 350 create a weather tight seal between the clips and cable jacket.

Referring next to FIGS. 4-1 and 4-2, shown are the multiple storage compartments or features. As shown, base unit 205 has a hinged connection 401 to cover 210. A fiber storage panel 405 also has a hinged connection 406 to an opposing side of base unit 205. The hinged fiber storage panel 405 has a first or front side 410 (shown in FIG. 4-2) and a second or rear side 415 (shown in FIG. 4-1), both having unique features which aid in providing storage and organization of the various cables described above.

Base unit 205 includes drop cable storage clips 420. The drop feed cable 110, which enters DIB 100 above the position of strain-relief cable clamp 320 as described above, is fed around the storage clips 420 and stored in the base unit 205 of the DIB. On the rear side 415 of the hinged fiber storage panel 405, there are two sets of spools 430 and 440 and two sets of corresponding storage clips 435 and 445. Spools 430 and storage clips 435 store feed cables 550 (shown in FIG. 5-4). Spools 440 and clips 445 store distribution cables 120. A break-out or furcation plug 450 positioned near the upper end of hinged connection 406 divides the drop feed cable 110 into multiple (e.g., typically four) individual feed cables 550.

On the front side 410 of hinged fiber storage panel 405 is an adapter bracket 460 which holds one or more connectors or adapters 465, such as four-to-eight port adapters. Adapters 465 convert between the feed cables 550 and the distribution cables 120. The connectors or adapters 465 are standard components used in the telecommunications industry for converting optical fiber signals between feed cables and distribution cables. However, positioning adapters 465 on the front side of hinged panel 405, and in an exemplary embodiment at a center location on the front side of the hinged panel opposite the storage spools and clips positioned on the rear side of the panel, allows for routing of both of the feed cables and the distribution cables while maintaining proper bend radius. Hinged storage panel 405 and DIB include further features, which are described below with reference to FIGS. 5-1 through 5-4 and 6-1 through 6-4, that aid in routing and storage of these cables while maintaining a proper bend radius.

Figures 1, 5:
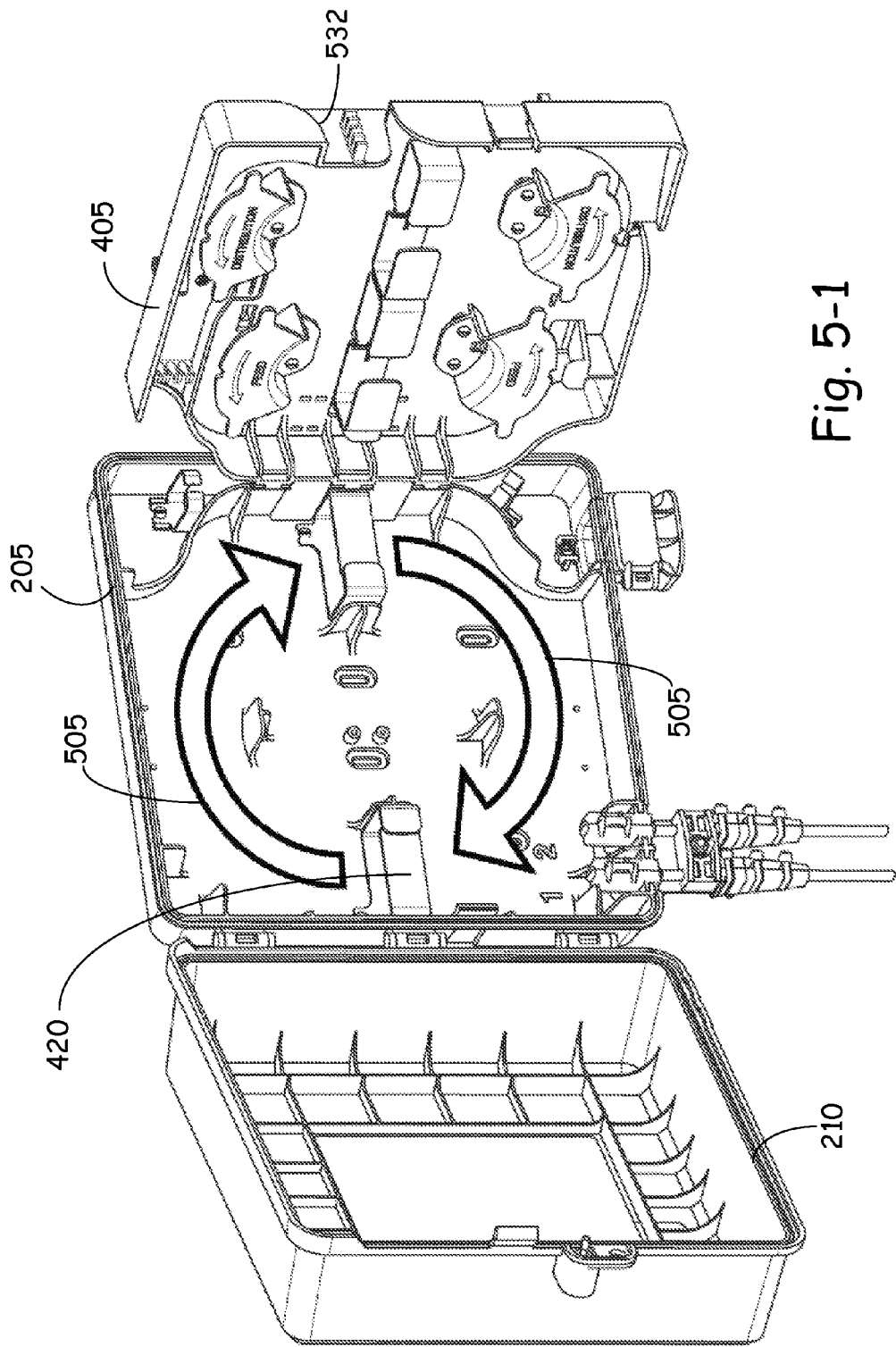
Figures 2, 5:
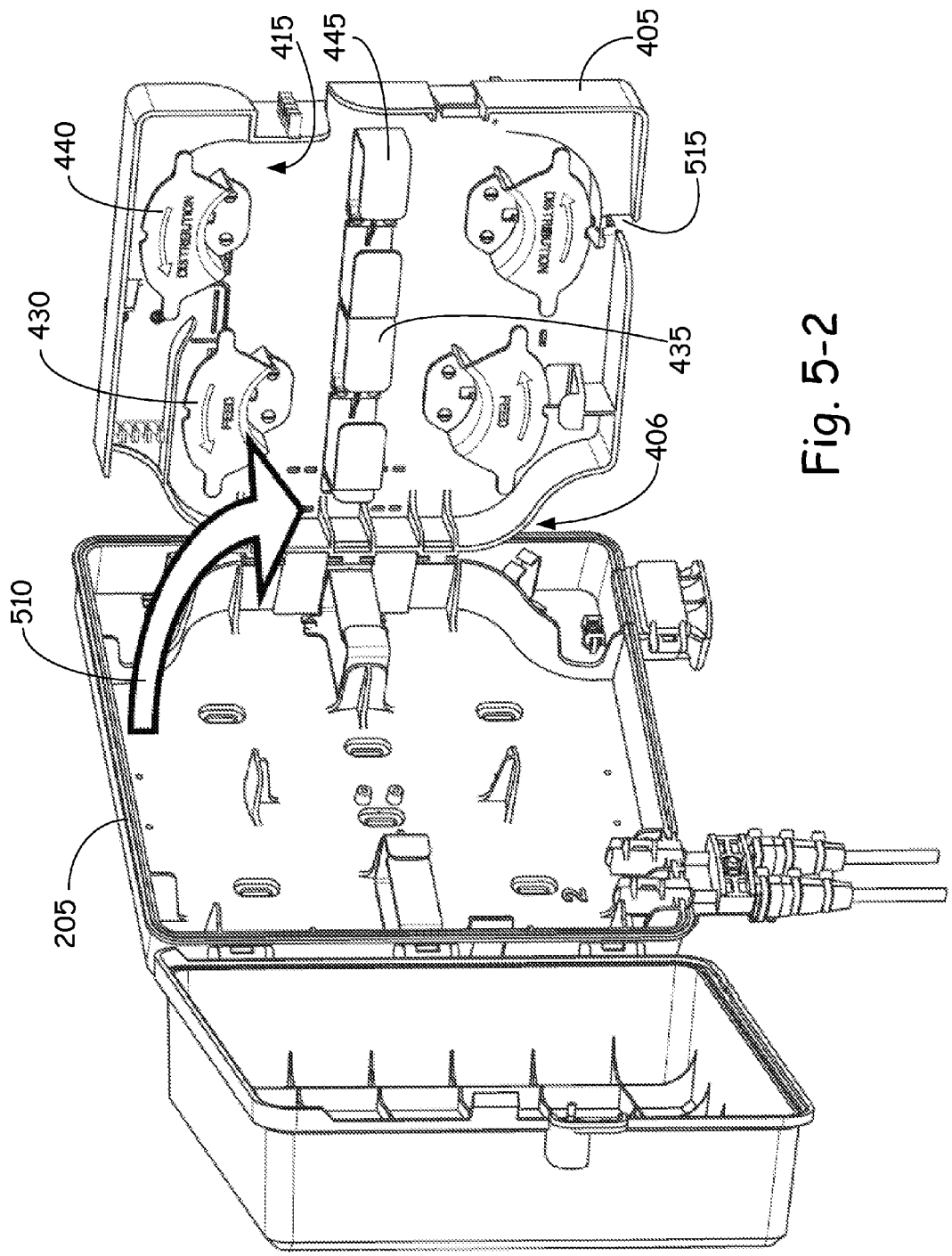
Figures 3, 5:
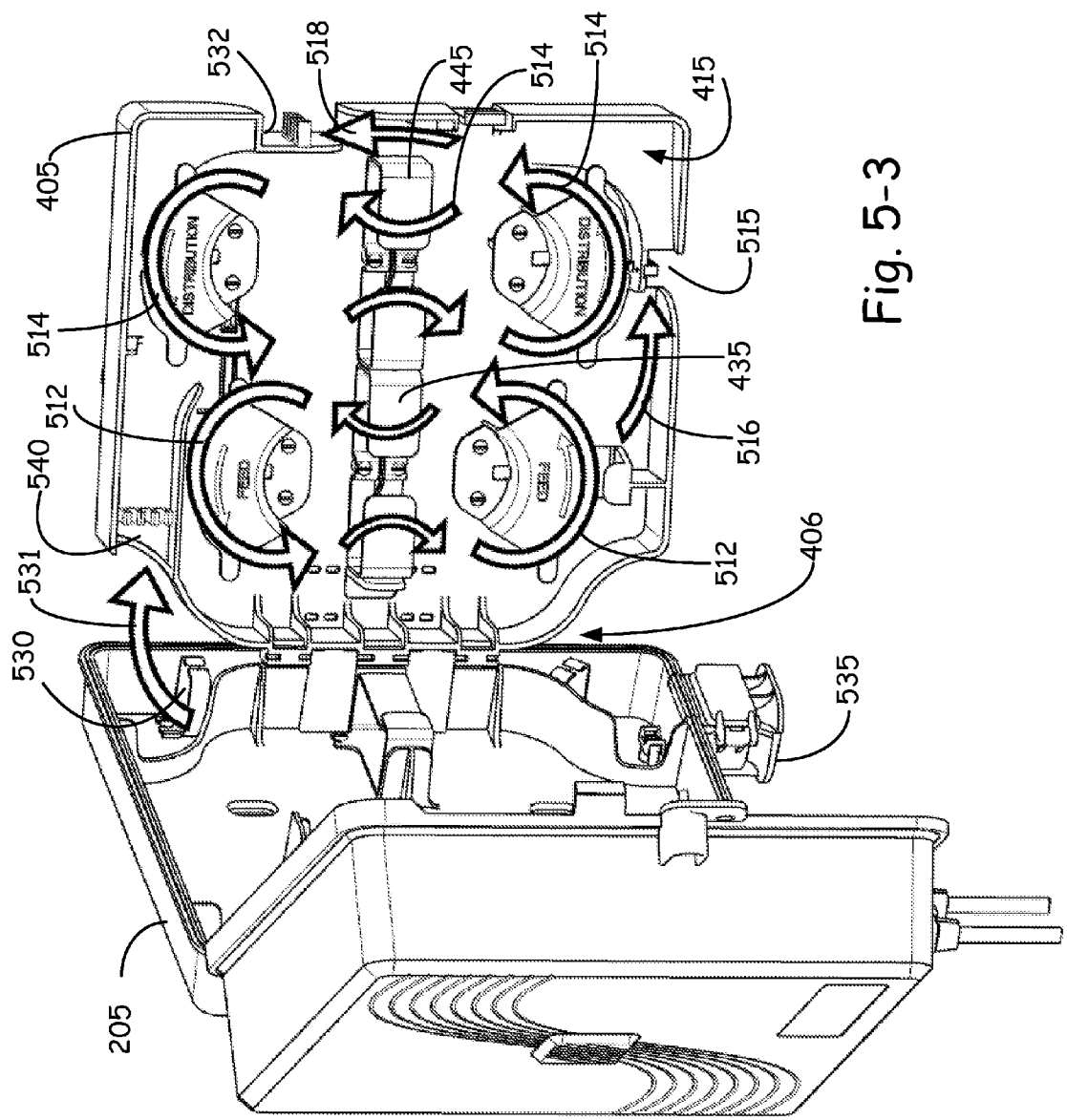
Figures 4, 5:
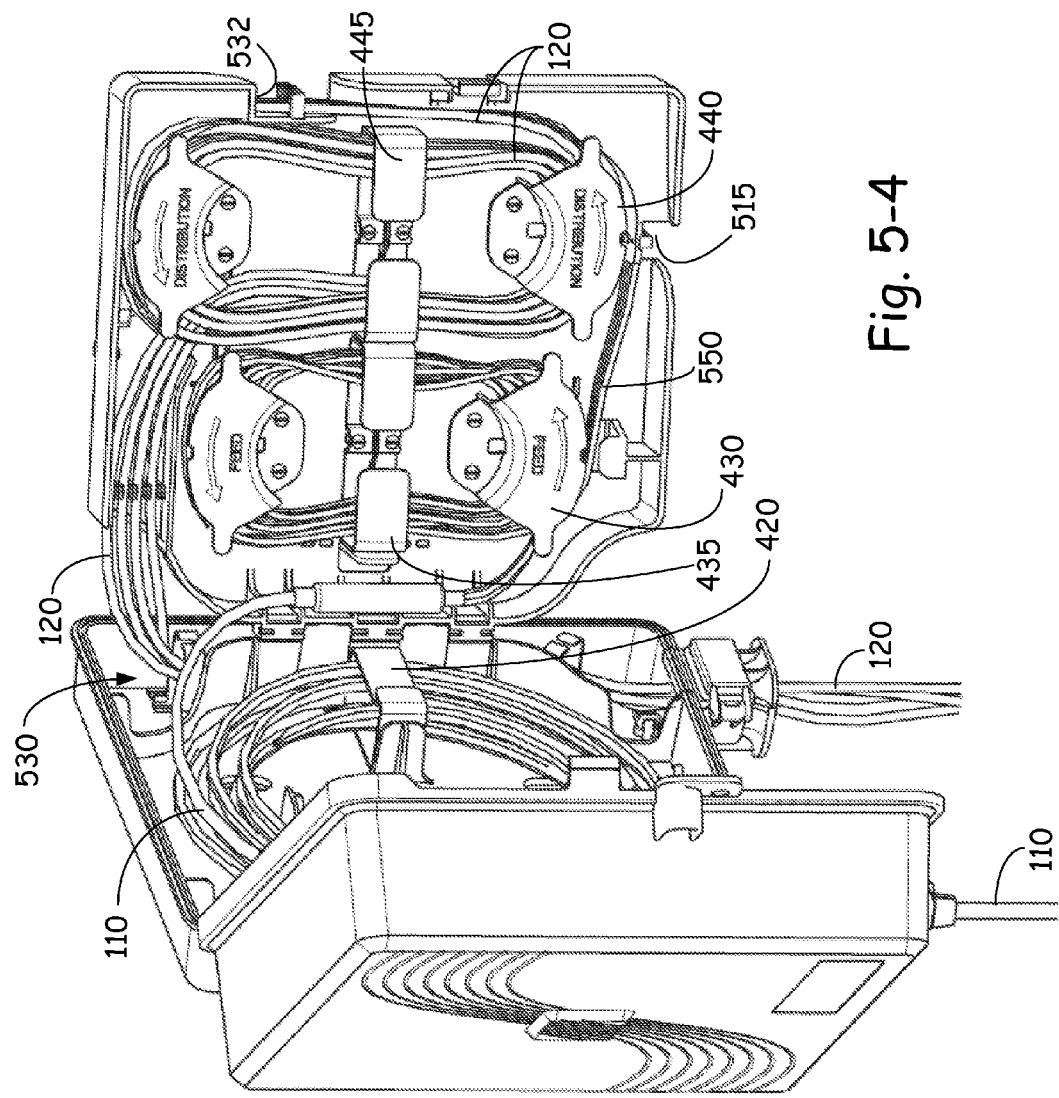

Referring now to FIG. 5-1, shown are mechanisms for, and a method of, storing the feeder cable with outdoor jacket, namely drop cable 110. The above-mentioned cable storage clips 420 are situated in the base 205 to retain coils of the outdoor jacketed feeder cable without unnecessary stress on the cable or violating minimum bend radius. Using storage clips 420, the cable 110 is coiled in the direction as shown at arrows 505 in accordance with the preferential bend axis or radius for the particular cable type.

Referring now to FIG. 5-2, shown is arrow 510 representing the routing of cable 110 from base 205 to the rear side 415 of hinged fiber storage panel 405. As discussed above, panel 405 is hinged to provide convenient access to both sides of the panel. The pairs of cable storage spools 430 and 440 and corresponding cable storage clips 435 and 445, as well as routing channels 515 and 532 through which cables transition between the front and rear of panel 405, are positioned and designed to (1) maintain separation of cable storage between the feed cables (stored on spools 430 and clips 435) and the distribution cables 120 (stored on spools 440 and clips 445); (2) support the manufacturer's specified minimum bend radius for the cables; and (3) allow cables to be added after the initial installation without cross-over of cable types. The feeder cable breakout adapter storage area is located on the panel 405 nearest the hinge axis 406 and aligned with the hinge axis to allow easy transition of the drop cable 110 from the storage in the base 205 to the panel 405. The proximity and alignment to the hinge also allows the panel to be operated (open and closed) without excessive stress to the cable transition. The feeder breakout cable storage clips 435 are located in parallel to the breakout adapter storage 450 (see FIG. 4-1) to provide a convenient transition and to maintain minimum bend radius. The feeder break-out cables 550 are routed and stored on spools 430 and clips 435 as represented by arrows 512 shown in FIG. 5-3. As described above the fiber storage panel 405 also incorporates an integrated cable channel 515 that maintains cable radius while transitioning the feeder cables from the storage clips 435 on the back 415 of the panel to the connectors 465 on the front 410 of the panel. Arrow 516 represents the transition of cables 550 into channel 515.

Referring now more particularly to FIG. 5-3, shown is an integrated cable channel 530 in base 205. Integrated cable channel 530 is positioned parallel to the panel hinge 406 and located to the side edge of base 205 to allow the distribution cable 120 to be routed from the distribution cable entrance 535 to the top of the base and onto the panel 405 through opening 540 without cross-over of the other cable types. Arrow 531 represents the routing of distribution cables 120 from channel 530 onto panel 405. The location of the cable clips 445 and cable channel 532 on the back side 415 of the panel allows the distribution cable 120 to transition from the backside 415 of panel 405 to the front side 410 of panel 405 without causing unnecessary stress or bending during panel movement or operation. The distribution cable storage clips 445 are oriented to provide a convenient transition and to maintain minimum bend radius. Arrows 514 represent the routing and storage of distribution cables 120 or spools 440 and clips 445. The integrated channel 532 on fiber storage panel 405 transitions the distribution cables 120 from the storage clips 445 on the rear side 415 to the adapters or connectors on the front 410 of the pane while maintaining an acceptable cable radius. Arrow 518 represents the transition into channel 532.

Referring now to FIG. 5-4, DIB 100 is shown with drop cable 110, feed cables 550 and distribution cables 120 routed and stored as described above.

Figures 1, 6:
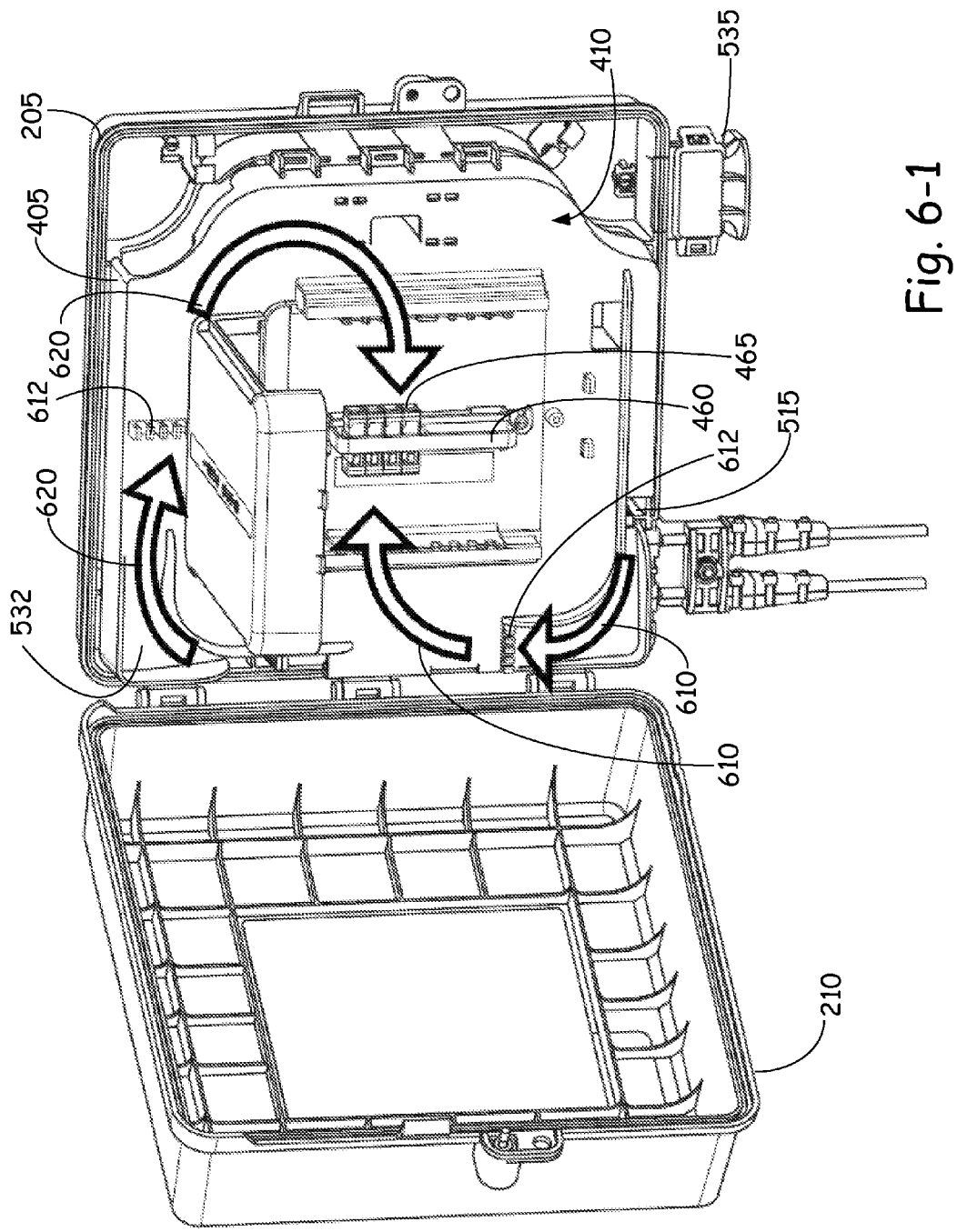
Figures 2, 6:
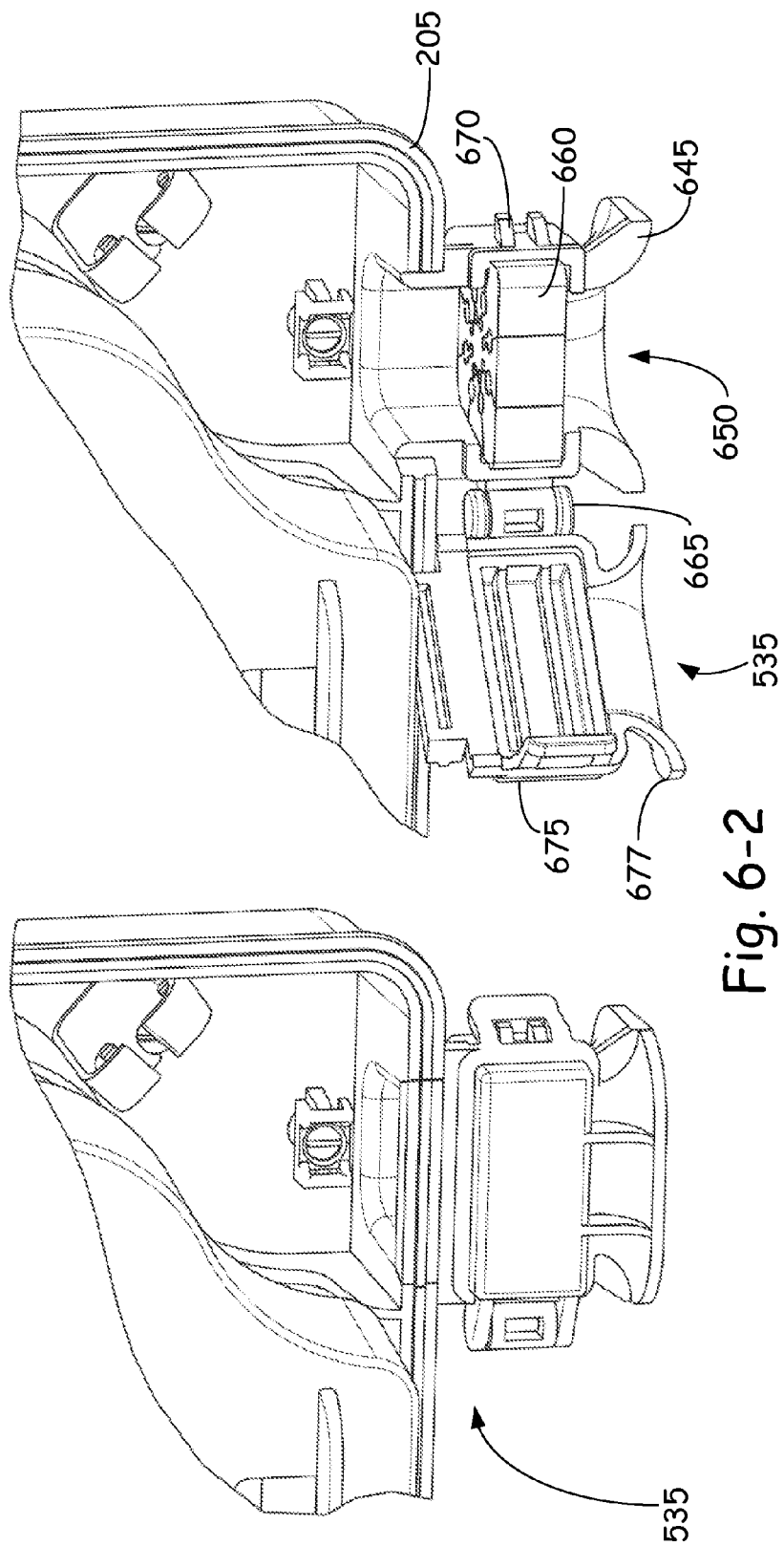
Figures 3, 6:
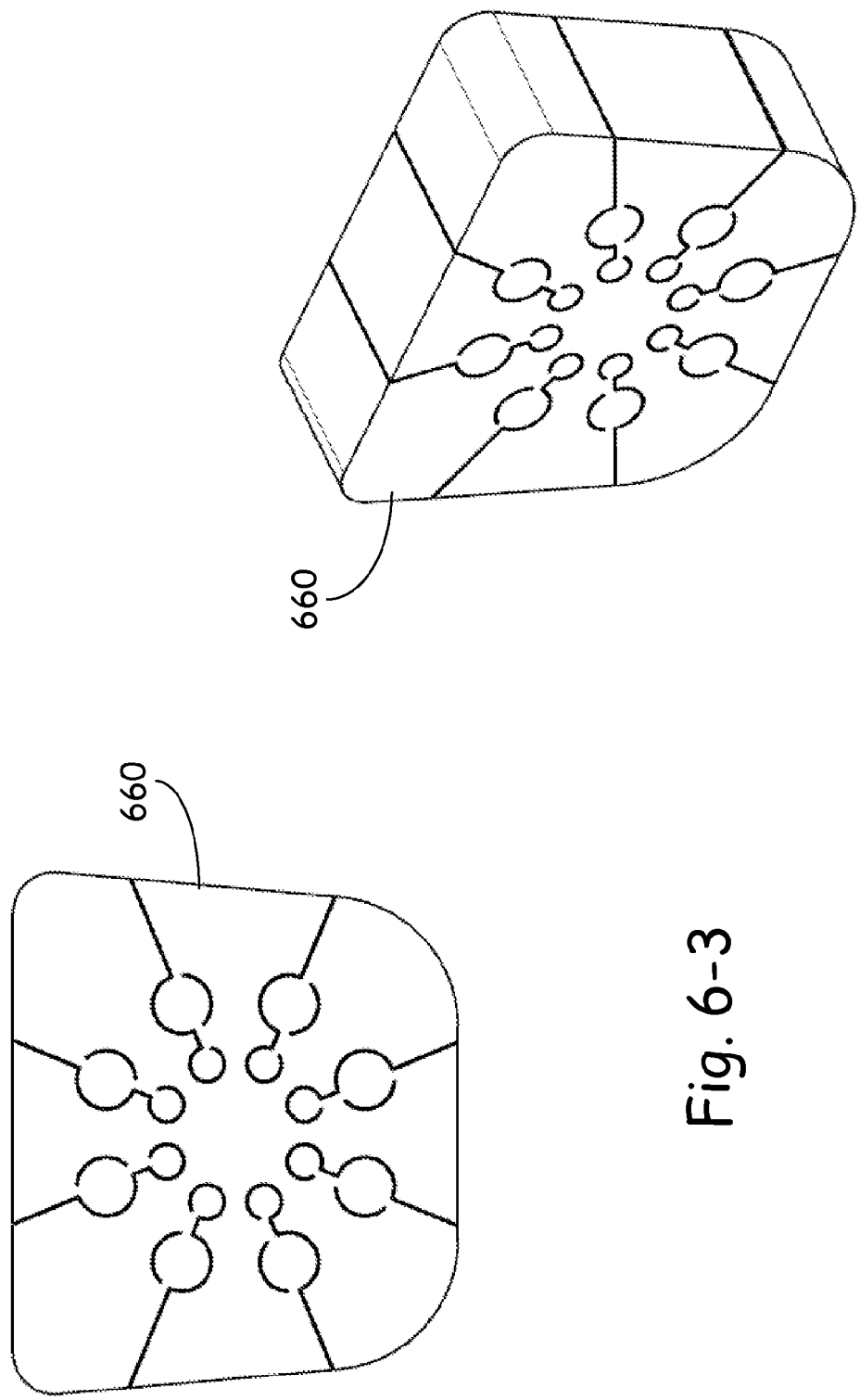
Figures 4, 6:
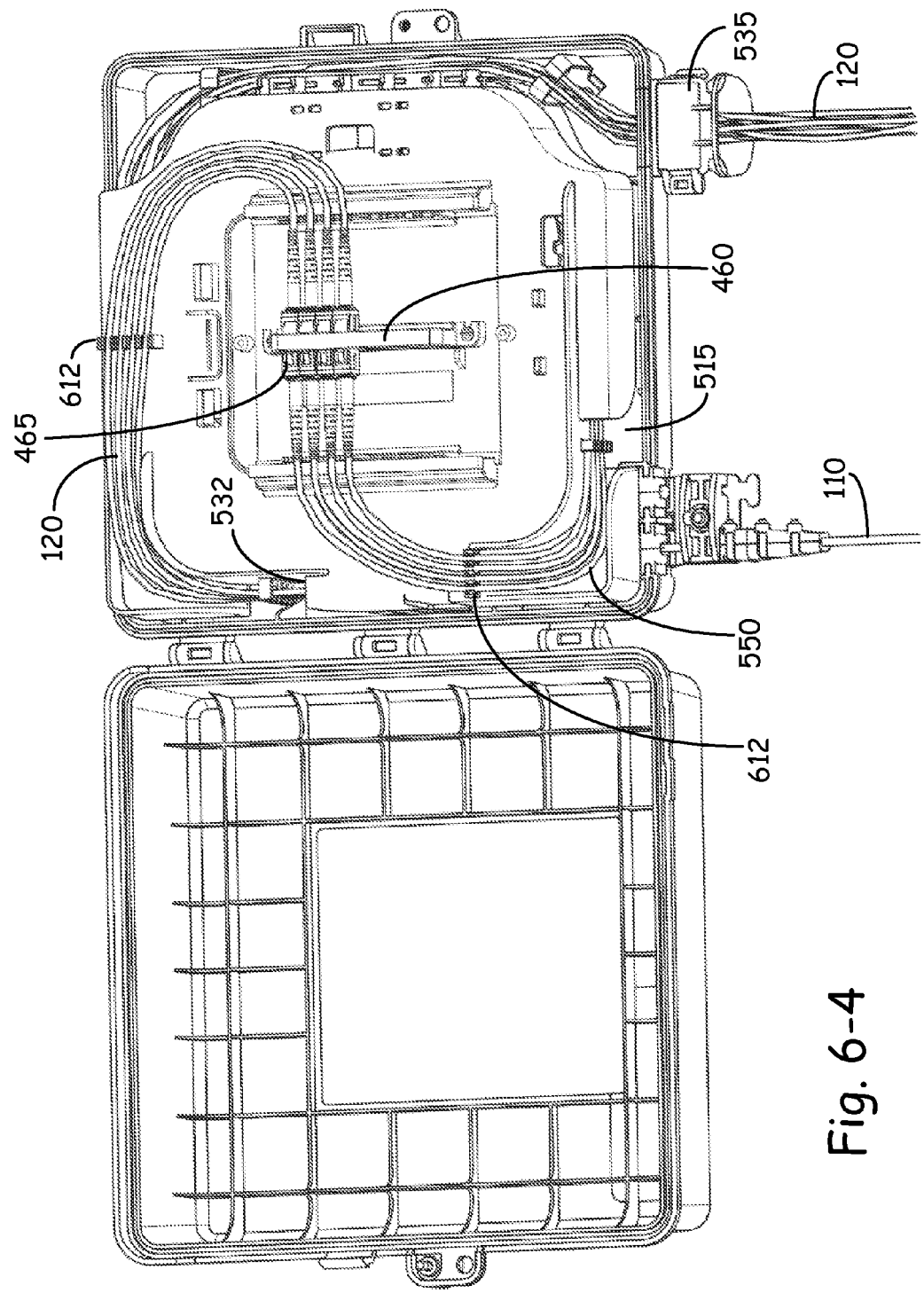

Referring now to FIG. 6-1, shown is panel 405 folded into base unit 205 for storage such that front side 410 of the panel is shown. The adapters or termination connectors 465 discussed above are shown on the front 410 of the panel oriented with respect to the cable channels 515 and 532 to maintain the necessary minimum bend radius during cable installation. Arrows 610 represent the routing of feed cables 550 on the front of panel 405, while arrows 620 represent the routing of distribution cables 120 on the same side. Channels 515 and 532 provide the transitions for these respective cables between the front and rear sides of the panel. Cable routing clips 612 attached to, or formed integrally with, panel 405 are also used to secure cables 120 and 550 to front side 410 of the panel in proper positions to maintain the acceptable bend radius specified by the cable manufacturer.

Referring now to FIG. 6-2, shown is the pre-connectorized distribution cable entry point 535 for distribution cable 120 in both open (right) and closed (left) positions. This entry point 535 includes an integrated cable grommet cavity 650 with bend limiting flange 645. An integrated portion of the enclosure base 205 provides the flange 645 and forms a cavity 650 to retain and compress the cable grommet 660 to provide a seal between the grommet, base 205, and cables 120. An integrated hinge 665 and latching system 670 are also provided for the cable entry cover portion 675. The integrated radius flange 645 limits the cable bend when pulled in any direction.

In an exemplary embodiment, the hinged cable entry cover 675 also includes a bend limiting flange 677. The cover 675 is in some embodiments a rigid cover that hinges on the grommet cavity 650. Opening the cover allows the grommet 660 to be removed, and when closed the cover 675 retains and compresses the grommet to provide a seal between the cover, grommet, base, and cables.

An example embodiment of a weather resistant pre-connectorized cable grommet 660 is shown in FIG. 6-3. Grommet 660 is, in exemplary embodiments, made of a flexible material such as rubber that will compress and seal against the base, cover and cables. The grommet employs cable ports comprising of thin slices though the material from the perimeter of the grommet towards the center. Near the center, the thin slices form a partial circle. These partial circle slugs can be peeled out to create a cavity for the cable. The radial slices protruding to the perimeter of the grommet can be spread open and a cable inserted without having to thread the cable end through the grommet.

Referring now to FIG. 6-4, DIB 100 is shown in its folded position (with front 410 of panel 405 shown facing out as the panel is stored in the base) with drop cable 110, feed cables 550 and distribution cables 120 routed and stored as described above, including the transition channels 515 and 532 as well as the cable adapters or connectors 465 positioned approximately at the center of panel 405.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. For example, in various embodiments, the DIB can be made from materials other than plastic. Further, the various components can be arranged in different ways than those specifically illustrated. Other examples of modifications of the disclosed concepts are also possible, without departing from the scope of the disclosed concepts.

What is claimed is:

1. A drop interface box configured to be mounted to a structure and to receive a drop cable from an optical fiber service provider distribution point and a plurality of distribution cables which distribute the optical fiber service, the drop interface box comprising:
 a base unit having a drop cable entrance configured to receive the drop cable and having drop cable retaining mechanisms spaced apart and configured to retain a length of drop cable looped around the drop cable retaining mechanisms;
 a cover having a hinged connection to the base unit to selectively enclose a storage area provided in the base unit; and
 a fiber storage panel having a hinged connection to the base unit on a side opposite the hinged connection of the cover to the base unit such that the fiber storage panel is moveable relative to the base unit and configured to be stored between the base unit and the cover, the fiber storage panel having first spools positioned to store a plurality of feed break-out cables coupleable to the drop cable, the fiber storage panel further having second spools positioned to store a plurality of distribution cables coupleable to the plurality of feed break-out cables.

2. The drop interface box of claim 1, wherein the fiber storage panel further includes an adapter bracket configured to hold one or more adapters which couple the plurality of feed break-out cables to the plurality of distribution cables.

3. The drop interface box of claim 2, wherein the adapter bracket is positioned on a first side of the fiber storage panel, and the first spools and second spools are positioned on a second side of the fiber storage panel.

4. The drop interface box of claim 3, and wherein the fiber storage panel further includes a first set of cable storage clips positioned on the second side of the fiber storage panel proximate the first spools to store the plurality of feed break-out cables, and a second set of cable storage clips positioned on the second side of the fiber storage panel proximate the second spools to store the plurality of distribution cables.

5. The drop interface box of claim 3, wherein the fiber storage panel further comprises a first routing channel and a second routing channel, the first routing channel configured to provide a routing path for transitioning the plurality of feed break-out cables between the first and second sides of the fiber storage panel, the second routing channel configured to provide a routing path for transitioning the plurality of distribution cables between the first and second sides of the fiber storage panel.

6. The drop interface box of claim 5, wherein the adapter bracket is positioned in a center region of the first side of the fiber storage panel such that the plurality of feed break-out cables transitioning through the first routing channel from the second side of the fiber storage panel to the first side of the fiber storage panel and the plurality of distribution cables transitioning through the second routing channel from the second side of the fiber storage panel to the first side of the fiber storage panel are coupleable to adapters in the adapter bracket without violating a minimum bend radius of the plurality of feed break-out cables or of the plurality of distribution cables.

7. The drop interface box of claim 5, wherein the base unit further comprises a cable channel formed substantially parallel to the hinged connection of the fiber storage panel to the base unit to allow the plurality of distribution cables to be routed from a distribution cable entrance at a bottom of the base unit toward a top of the base unit and onto the fiber storage panel.

8. The drop interface box of claim 7, wherein the distribution cable entrance includes a cable grommet cavity and a bend limiting flange.

9. The drop interface box of claim 8, and further comprising a cable grommet retainable within the cable grommet cavity to provide a seal between the cable grommet, base unit, and the plurality of distribution cables.

10. The drop interface box of claim 1, wherein the drop cable retaining mechanisms in the base unit comprise storage clips positioned on opposing sides of the base unit.

11. The drop interface box of claim 1, wherein the drop cable entrance further comprises slots formed in the base unit and configured to receive a cable clip which clips over the drop cable, the slots and the cable clip forming a substantially weather tight seal with the base unit.

12. The drop interface box of claim 11, and further comprising a strain-relief clamp coupled to the base unit proximate the drop cable entrance.

13. The drop interface box of claim 1, and further comprising a security mechanism for securing the cover to the base unit in a closed position.

14. A drop interface box configured to be mounted to a structure and to receive a drop cable from an optical fiber service provider distribution point and a plurality of distribution cables which distribute the optical fiber service, the drop interface box comprising:
 a base unit having a drop cable entrance configured to receive the drop cable and having drop cable retaining mechanisms spaced apart and configured to retain a length of drop cable looped around the drop cable retaining mechanisms;
 a cover having a hinged connection to the base unit to selectively enclose a storage area provided in the base unit; and
 a fiber storage panel having first and second sides and being moveable relative to the base unit and configured to be stored between the base unit and the cover, the fiber storage panel having first spools positioned to store a plurality of feed break-out cables coupleable to the drop cable, second spools positioned to store a plurality of distribution cables coupleable to the plurality of feed break-out cables, and an adapter bracket configured to hold one or more adapters which couple the plurality of feed break-out cables to the plurality of distribution cables, wherein the adapter bracket is positioned on the first side of the fiber storage panel, and the first spools and second spools are positioned on the second side of the fiber storage panel, and wherein the fiber storage panel further includes a first set of cable storage clips positioned on the second side of the fiber storage panel proximate the first spools to store the plurality of feed break-out cables, and a second set of cable storage clips positioned on the second side of the fiber storage panel proximate the second spools to store the plurality of distribution cables.

15. A drop interface box configured to be mounted to a structure and to receive a drop cable from an optical fiber service provider distribution point and a plurality of distribution cables which distribute the optical fiber service, the drop interface box comprising:
- a base unit having a drop cable entrance configured to receive the drop cable and having drop cable retaining mechanisms spaced apart and configured to retain a length of drop cable looped around the drop cable retaining mechanisms;
- a cover having a hinged connection to the base unit to selectively enclose a storage area provided in the base unit; and
- a fiber storage panel having first and second sides and being moveable relative to the base unit and configured to be stored between the base unit and the cover, the fiber storage panel having first spools positioned to store a plurality of feed break-out cables coupleable to the drop cable, second spools positioned to store a plurality of distribution cables coupleable to the plurality of feed break-out cables, and an adapter bracket configured to hold one or more adapters which couple the plurality of feed break-out cables to the plurality of distribution cables, wherein the adapter bracket is positioned on the first side of the fiber storage panel, and the first spools and second spools are positioned on the second side of the fiber storage panel, wherein the fiber storage panel further comprises a first routing channel and a second routing channel, the first routing channel configured to provide a routing path for transitioning the plurality of feed break-out cables between the first and second sides of the fiber storage panel, the second routing channel configured to provide a routing path for transitioning the plurality of distribution cables between the first and second sides of the fiber storage panel.

16. The drop interface box of claim 15, wherein the adapter bracket is positioned in a center region of the first side of the fiber storage panel such that the plurality of feed break-out cables transitioning through the first routing channel from the second side of the fiber storage panel to the first side of the fiber storage panel and the plurality of distribution cables transitioning through the second routing channel from the second side of the fiber storage panel to the first side of the fiber storage panel are coupleable to adapters in the adapter bracket without violating a minimum bend radius of the plurality of feed break-out cables or of the plurality of distribution cables.

17. The drop interface box of claim 15, wherein the base unit further comprises a cable channel formed substantially parallel to the hinged connection of the fiber storage panel to the base unit to allow the plurality of distribution cables to be routed from a distribution cable entrance at a bottom of the base unit toward a top of the base unit and onto the fiber storage panel.

18. The drop interface box of claim 17, wherein the distribution cable entrance includes a cable grommet cavity and a bend limiting flange.

19. The drop interface box of claim 18, and further comprising a cable grommet retainable within the cable grommet cavity to provide a seal between the cable grommet, base unit, and the plurality of distribution cables.

* * * * *